Feb. 24, 1959 J. W. BREMER, JR 2,875,220
HYDROGENATION OF FAT
Filed Sept. 14, 1956 2 Sheets-Sheet 2

INVENTOR.
JOSEPH W. BREMER, JR.
BY R. G. Story
ATTORNEY

United States Patent Office 2,875,220
Patented Feb. 24, 1959

2,875,220

HYDROGENATION OF FAT

Joseph W. Bremer, Jr., Chicago, Ill., assignor to Swift & Company, Chicago, Ill., a corporation of Illinois Application September 14, 1956, Serial No. 609,959

3 Claims. (Cl. 260—409)

This invention relates to an improved method and apparatus for manufacturing a hydrogenated oil having an improved flavor and greater oxidative stability, and in its preferred embodiment it is possible to effect an appreciable saving in nickel catalyst.

Today in the manufacture of a hydrogenated fat, the oil is necessarily subjected to very abusive treatment which impairs flavor and has an adverse effect on the oxidative stability of the oil. Also because of the manner employed for separating the catalyst from the hydrogenated fat the catalyst is not generally reused. In some few operations a minor proportion of the catalyst may be recovered and reused. The nickel catalyst has been historically separated through the use of a filter press. The filter press will not filter out the fine nickel particles themselves and hence it is necessary that diatomaceous earth or carbon or other suitable absorbent be added to the oil. Today the hydrogenated oil goes first to what is known as a "black press pot" which is a large vat and in this vat diatomaceous earth is added to entrap and entrain the nickel. In order to get a suspension of the earth in the hot oil, the oil is agitated and since the "black press pot" is open to the atmosphere, appreciable quantities of air will be enveloped in the hot oil. The oil with the suspended diatomaceous earth is then passed to the filter press where the added earth and most of the nickel catalyst will be filtered out. The oil from the filter press is collected in a trough open to the air. Normally the filtered oil passes to a second large open vat where more diatomaceous earth is added under agitation. From this second vat the oil flows to the "white" press where the oil is repeatedly recycled until the chemical test for nickel is negative. Here, as in the first filter, the oil is generally collected in an open trough. It is readily apparent why hydrogenated oil produced in this manner will have a relatively high peroxide value. Peroxide values of 0.5 to 3.0 and sometimes greater in milliequivalents of iodine per kilogram of fat are frequently present on completion of the filtration operation.

The diatomaceous earth builds up a filter cake which contains appreciable quantities of the oil. The amount of oil so entrapped is sufficiently large to justify its recovery and to accomplish this the filter press is blown first with air and then steam and finally again with air, the purpose being to remove the oil from the press cake. This oil has a relatively high peroxide value and is isolated from the filtered hydrogenated oil. The filter cake oil must subsequently be processed to separate the moisture and is again reworked, and despite the foregoing processing it is generally regarded as a lower grade oil. Even with all of the foregoing treatment of filter cake, the cake will still contain approximately 30% of its weight as oil. It is usually not profitable to separate the nickel from the cake and it is consequently discarded. Contact with air and steam greatly reduces the activity of the nickel catalyst.

It is evident that the conventional manner of producing a hydrogenated oil is time-consuming and expensive. There is a considerable expenditure for filter cloths and diatomaceous earth and/or activated carbon. Several operators are required to practice this process and there is an appreciable oil loss in the filter cakes. In addition, the nickel catalyst is lost and there is a downgrading of the oil recovered from the filter cake.

It is an object of this invention to provide an improved method for manufacturing a hydrogenated fat to produce a superior product and to obtain an oil having a greater oxidative stability. Another object of my invention is to provide an improved apparatus for manufacturing hydrogenated oil. It is a further object of my invention to provide apparatus and method to permit a saving in hydrogenation catalyst. A still further object is to provide means and method for magnetically separating nickel catalyst from the hydrogenated fat.

The apparatus and method of the present invention permits the manufacture of a hydrogenated oil with superior flavor and remarkably greater oxidative stability than possible with conventional processing and apparatus. It is also possible in the practice of a preferred embodiment of my process to realize an appreciable saving in nickel catalyst. As mentioned earlier, the peroxide value of a conventionally processed oil out of the filter is on the order of 0.5 to 3.0 or greater. With my process and apparatus the oil at the same stage of processing can be expected to have a peroxide value less than 1, and in most instances less than 0.5.

In its broad aspects my process contemplates passing the hydrogenated fat having the catalyst entrained therein to a separation zone where it is subjected to a magnetic force containing a multiplicity of magnetic poles to separate the nickel from the oil. Preferably, the hydrogenated oil is cooled and this may best be done after separation of the nickel catalyst as the nickel is separated with greater ease from a hotter oil. The processing is preferably carried on in the substantial absence of air. In one embodiment, after filtering a hydrogenated fat, an unhydrogenated oil will be forced through the separation zone in the absence of the magnetic force to pick up the separated catalyst. The unhydrogenated oil with the picked-up catalyst is conducted to a hydrogenating zone.

Nickel is generally classified as only slightly magnetic. However, I have discovered that it is sufficiently susceptible to magnetism to permit its effective separation from liquid fats. In order to effectively separate nickel the magnetic filtering means must furnish a multiplicity of poles. This may be had by utilizing a highly permeable ferrous material fabricated in strands which are closely packed together in random orientation.

The hydrogenated oil from the converter may have from 150 to 300 parts per million of the reduced nickel catalyst in the oil. With the system of this invention, the nickel content has been reduced to as low as 3 p. p. m. Efficiency within the range of 90 to 94% or thereabout may be had with acceptable operating flow rates. The efficiency may be improved to as high as 98% by reduction of the flow rate or by employing a series of magnetic filters.

Figure 1:
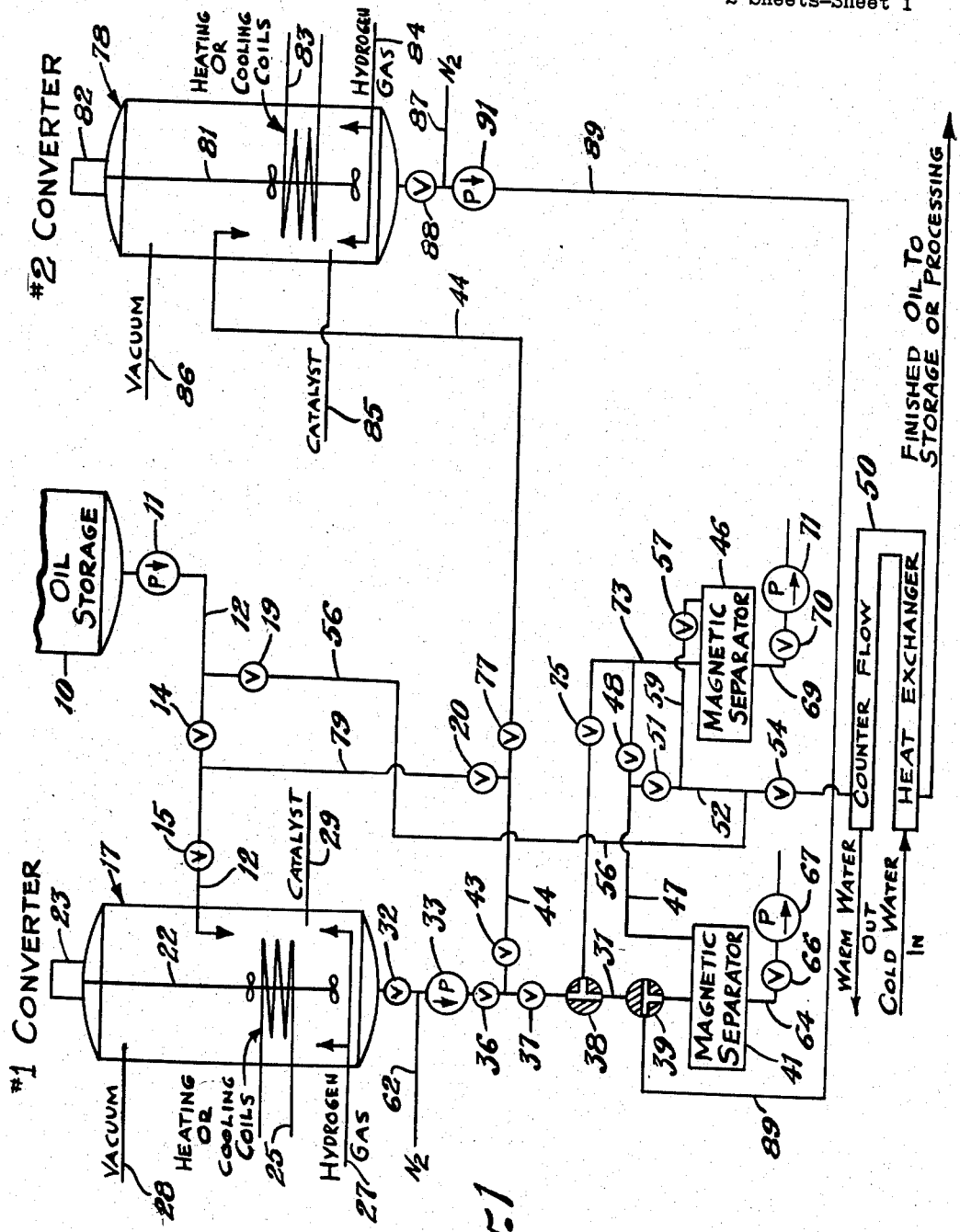
Figure 1 is a flow diagram of my improved system for hydrogenating the fat including a magnetic separator.

The system illustrated in Figure 1 is a preferred embodiment of apparatus that may be used in my improved process of hydrogenating fats to obtain a product of superior flavor stability and improved oxidative stability. Oil is stored in a large tank 10 from where it may be forced under pressure by a positive discharge pump 11 through line 12 and open valves 14 and 15 into the interior of a large hydrogenation vessel or converter 17. Two valves 19 and 20 which are disposed in lines branching off from line 12 are closed. The hydrogenation vessel is designed to hold between 25,000 and 30,000 pounds of oil and is provided with an agitator 22 which extends downward along the axis of the vessel from a motor 23 at the exterior top of the converter. There is provided a coil 25 which may carry either heating or cooling fluids. The hydrogen gas for hydrogenating the fats is carried to the vessel through a line 27 from a suitable source of supply. A vacuum line 28 from a conventional vacuum pump opens into the vessel adjacent its top. The catalyst may be added to the oil under vacuum through a conduit 29.

The oil to be hydrogenated is heated to a temperature of 150° F. at which temperature a vacuum of approximately 28" Hg is drawn on the vessel. It is conventional practice to introduce the catalyst in a suitable liquid vehicle into the vessel when the oil has reached the temperature of 150° F. The hydrogenation catalyst for this amount of oil will be about 6½ pounds of reduced nickel suspended in perhaps 20 pounds of a hardened oil medium. The catalyst in a portion of warm (150° F.) oil to be hydrogenated is then drawn into the converter. The particle size of the individual particles of reduced nickel hydrogenation catalyst will depend to some extent on the process used in their manufacture and will generally range between 20 and 200 microns. After addition of the catalyst the oil is heated to within the range of 212–425° F. A common operating temperature is 355° F. Upon reaching the operating temperature agitation is begun and hydrogen gas is added to the oil under a gauge pressure of normally 5 p. s. i. With the introduction of the hydrogen gas hydrogenation commences and is continued until the refractive index indicates that the desired degree of hydrogenation of the oil has been reached. This operation will likely take from 20 to 190 minutes depending on the type of product being manufactured, the conditions of hydrogenation, and the saturation of the material being treated. Each time a refractive index is taken, hydrogenation is interrupted and a vacuum is drawn on the vessel. When the degree of hydrogenation desired has been obtained, the vessel is emptied through a line 31 which opens into the bottom of the vessel and an open valve 32 by a positive discharge pump 33. Valve 32 had been closed during the hydrogenation process.

The hot hydrogenated oil passes through line 31 and valves 36 and 37 and on through two 3-way cocks 38 and 39 into the inlet side of a magnetic separator 41. A valve 43 in a branch line 44 connected to the line 31 is closed and the two 3-way cocks previously mentioned are set to pass the oil along conduit 31 and to close off the branch conduits coupling into them. This is achieved by turning the 3-way cocks 38 and 39 from the position illustrated in Figure 1. The nickel is substantialy removed from the hydrogenated oil within the magnetic filter 41 and at this point the oil may be passed through a second magnetic separator 46 which is coupled in series with the first-mentioned magnetic separator by a conduit 47. A valve 48 in this latter conduit control the flow therethrough, valve 51 being closed. In an alternative, the oil from the first-mentioned magnetic separator may be led to a counter-flow heat exchanger 50. In the event that the oil need only be subjected to a single magnetic filtering, the previously mentioned valve 48 of line 47 is closed and a valve 51 in a branch line 52 to the aforementioned conduit 47 is opened along with a second valve 54 in the line 52, thus permitting passage of the oil directly to the heat exchanger thereby shunting the second magnetic separator. As is apparent from an examination of the flow sheet, in the instance where the single magnetic separator 41 is employed, it will be necessary to close valve 19 found in a line 56 and to close a valve 57 in an exit line 59 from the second magnetic filter 46, otherwise if the latter valve 57 were open a portion of the oil passing through the line 52 might back flush the second magnetic filter since the exit line of the filter 46 opens into line 52. In the instance where the two magnetic separators are connected in series the oil exiting from the second magnetic separator passes through line 59 emptying into line 52 at a point just beyond the valve 51 which would be closed, from which point it flows along line 52 through the open valve 54 into the inlet of the aforementioned heat exchanger.

The oil out of the hydrogenator will likely be in the neighborhood of 285° F. or thereabout, and there will be a drop in temperature through the system preceding the heat exchanger which is preferably cooled with water flowing counter the direction of the oil. I prefer to drop the temperature of the oil in the heat exchanger to within 20–30° F. of the solidification point of the particular oil being processed. In an alternative the oil may be cooled preceding the magnetic separation step, but it is generally not preferred to do so because this will raise the viscosity of the oil throughout the system beyond the heat exchanger and through the magnetic separator. This in turn will result in generally poorer removal efficiencies if the oil is cooled below 200° F. The cooled oil out of the heat exchanger 50 of Figure 1 goes to storage or to further processing.

In my preferred embodiment a nitrogen line 62 opens into the line 32 from the first converter at a point intermediate the valve 32 and the pump 33. Nitrogen under pressure, or other suitable inert gas under pressure, is provided for forcing the hydrogenated oil through the system after the converter is emptied. By this arrangement it is possible to substantially clear the system of hydrogenated oil and thus avoid contamination of subsequently treated batches. There is provided means for draining each of the magnetic separators. This is necessary as there will normally be left in the respective magnetic separator small amounts of the hydrogenated oil and this oil could contaminate a stream of unhydrogenated oil (to be described shortly) used for flushing the filter. A line 64 connects to the sump 65 of the magnetic separator 41. There is disposed along the length of this line 64 a valve 66 and immediately beyond it a positive discharge pump 67. Line 64, after passing pump 67, leads to a discard reservoir. The other magnetic separator 46 is provided with a similar sump line 69 leading to the discard reservoir and, a valve 70 and a pump 71.

As heretofore discussed, it is possible with the use of the system of my invention to effect a considerable savings of catalyst. This is accomplished by flushing the magnetic separators with unhydrogenated oil to remove the retained catalyst. The unhydrogenated oil with the recovered catalyst dispersed throughout is used as a charge for a converter. In the system illustrated, a stream of oil, unhydrogenated, from the oil storage tank 10 is pumped through lines 12 and 56 by the pump 11 which is found at the bottom of the storage tank. As is evident, it is necessary that line 12 beyond the branch off of the line 56 be blocked and this is done by closing the valve 14. The unhydrogenated oil passes through open valve 19 along line 56 to its juncture with line 52. Line 52 is blocked a short distance in each direction of the closed valves 51 and 54, which results in the oil passing into the exit side of the second magnetic filter 46 through the exit line 59 thereby flushing said filter. The flushing oil containing the catalyst leaves the separator 46 through the inlet line 73 and may be passed either to the second magnetic separator by a suitable setting of the valves to remove its entrapped catalyst, or, by opening valve 75 in line 73 and closing valve 48 in line 47, the oil will pass to the 3-way cock 38. This latter valve will be set to pass the oil to the portion of line 31 above valve 38 in Figure 1 through open valve 37 to the juncture of line 31 with branch conduit 44. By closing valve 36 in line 31 and opening valve 43 and valve 77 in line 44, the unhydrogenated oil, with the catalyst dispersed therein, may be used as the charge for a second converter 78. Or, in an alternative, the branch line 44 may be blocked at a point along its length by closing valve 77, and by opening valve 20 of a line 79 the unhydrogenated oil may be passed to the first converter and used to charge it, providing, of course, valve 14 of line 12 is closed and valve 15 of the same line is open.

The second converter 78 is like the first in structure, being provided with an agitator 81 driven by a motor 82. The second converter has a heating or cooling coil 83 and a hydrogen gas line 84. All the catalyst, or such make-up catalyst as may be necessary, may be added to the second converter through a line 85. A vacuum line 86 opens into the top of the converter. The second converter has a valve 88 adjacent its outlet in a line 89. Immediately beyond valve 88 there is a positive discharge pump 91. A nitrogen line 87 opens into the line 89 at a point between the pump 91 and the valve 88. Line 89 connects into the previously described 3-way cock 39 and when that valve is set in the position illustrated the hydrogenated oil from the second converter passes into the first magnetic separator 41. It is possible by a suitable setting of the two 3-way cocks 38 and 39 and by closing valve 37 to shunt the oil through the line 73 and the open valve 75 into the second magnetic separator 46.

Figure 2:
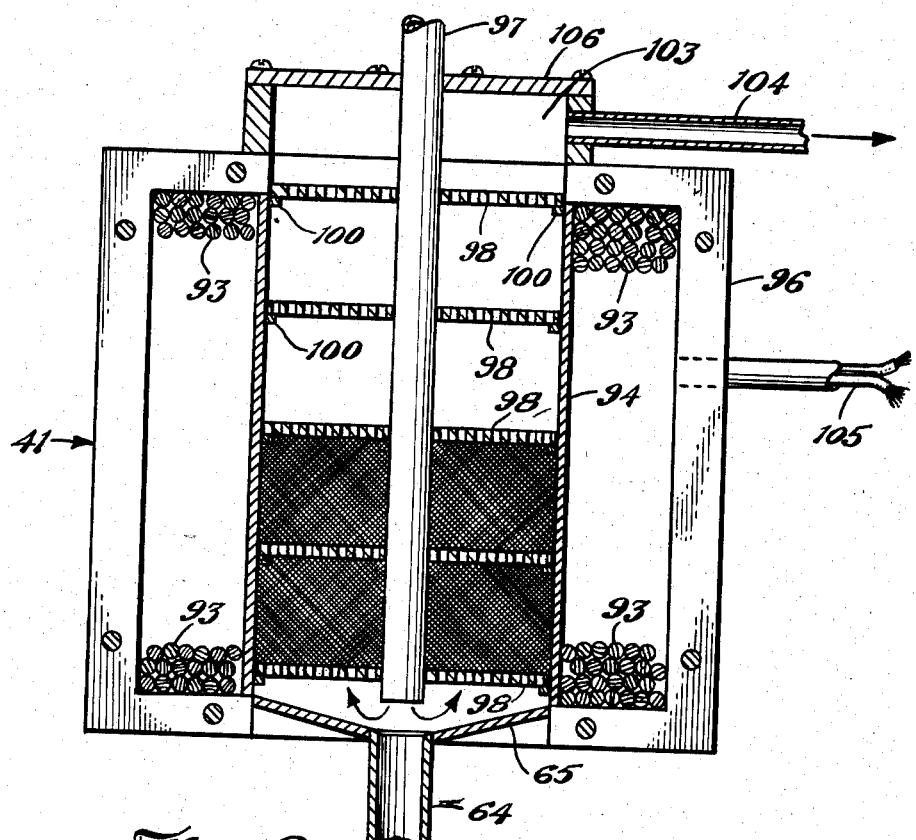
Figure 2 is a cross-sectional view of an embodiment of the magnetic separator.
Figure 4:
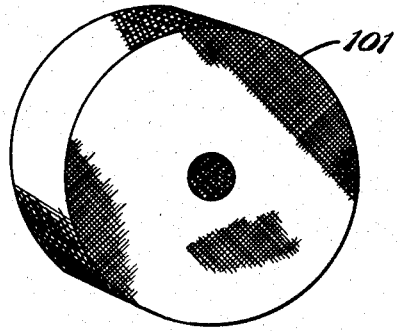
Figure 4 is a perspective of a filter insert made up of interwoven ferrous strands for use in the magnetic separator.
Figure 3:
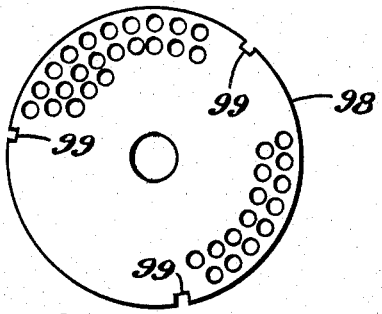
Figure 3 is a plan view of a perforated supporting plate used in the magnetic separator.

The magnetic separator 41 is illustrated in detail in Figures 2, 3, and 4. This is a preferred filter which I have found to be effective in removing nickel from hardened oil. A copper coil 93 the turns of which are covered with high temperature glass insulation is wound around a cylindrical inner sleeve 94 which is preferably made of a substantially nonmagnetic material such as a ceramic. The sleeve may be fabricated from a low magnetic material like stainless steel. Immediately surrounding the coils 93 is a cylindrical pole piece 96 made of material having high magnetic permeability. The pole piece, if desired, may be fabricated in two pieces and joined together. The pole pieces, which may be described as the outer case, is preferably manufactured of a dynamo steel. The inner sleeve 94 has placed along its axis a vertical inlet pipe 97. This latter pipe stops short of the bottom of the sump 65. There are five round perforated supporting plates 98 horizontally spaced equidistant from each other along the length of the inlet pipe within the inner sleeve. Each of the supporting plates is carried by several brackets 100, which brackets are attached to the inner wall of the sleeve. Plates 98 have notches 99 spaced about the periphery thereof at a spacing corresponding to the spacing of brackets 100 so that the plates may be inserted into and removed from the filter. After insertion the plates may be turned so that the unnotched portions of the periphery rest on the brackets. There are four doughnut-shaped magnetic filter inserts 101 in the spaces between the several perforated plates. The vertical inlet pipe passes through the cores of the filter inserts. These filters are made of high-permeable ferrous metallic strands which are interwoven and intertwined to provide a multitude of magnetic poles. The process of manufacture of these strands preferably leaves a multiplicity of sharp edges and corners on the strands, all of which facilitates removal of nickel. Metallic strand masses suitable for my purposes will generally have voids making up 50 to 85% of the volume. The matted mass should not be made too dense otherwise it will provide a physical impediment to the flow of the oil, thereby building up an excessive back pressure in the system. A feature of this invention is that the filtering is accomplished not by physical entrapment of the catalytic agent, but rather by magnetic attraction.

The design of the filter illustrated in Figure 2 permits the effective removal of nickel. Nickel has a low magnetic susceptibility and it was found that a pattern of spaced magnetizable grids would not separate the catalyst from the oil. A mass of steel wool is more effective but it was discovered that the most efficient recovery was had with the use of more than one mass where the masses are separated by magnetizable grids. These grids appear to strengthen the magnetic field to an extent that efficient separation of the nickel may be had.

The oil leaves the inlet pipe 97 at the sump of the filter and flows upwardly within the sleeve through the perforated plates and the magnetic inserts, collecting at the top of the filter in a reservoir 103 from whence it is removed by an outlet pipe 104. The filter is closed at its top by a plate 106. Power for energizing the filter is supplied through wires 105 connected to coil 93 and to a suitable source of electrical power. The power requirements for the filter are insignificant. Only a magnetic filter having a vast number of magnetic poles may be employed to separate nickel from oil. The filtering magnetic inserts 101 resemble the commercially available product "steel wool."

In my system the lines and valves are disposed to permit back flushing of the magnetic separators. It would, of course, be possible to flush in the direction of flow of the hydrogenated oil. When flushing, the electric current to the filter is interrupted to demagnetize the inserts and release the catalyst from the filter. An unhydrogenated oil from the storage tank is pumped at a high flow rate countercurrent of the normal flow through the magnetic separator or separators and then introduced as the charge to one of the two converters. Preferably the flushing oil is moved through the lines and filter at about 10 times the flow rate of the hydrogenated oil. The reason for this is two fold: (1) to facilitate dislodging the nickel from the filter; and (2) to assure maintenance of the catalyst in suspension in the oil to avoid settling out of the catalyst in the lines of the system. A loss in catalyst up to 10% may be expected. Make-up catalysts are added through the catalyst line 29 of the first converter and catalyst line 85 of the second converter. The selectivity of the recovered catalyst plus the make-up catalyst is comparable to the selectivity attainable through the use of all fresh catalyst.

As mentioned heretofore, one of the advantages of the method and apparatus of this invention is that it permits the manufacture of a hydrogenated fat having superior flavor and greater oxidative stability. To accomplish this a system substantially closed to air is necessary. In the preferred embodiment nitrogen gas is employed during the operation. The peroxide value of the hydrogenated oil from the magnetic separator or separators is appreciably less than that commonly experienced where diatomaceous earth and a filter press are utilized. Various forms of reduced nickel hydrogenation catalyst may be used, including reduced nickel alloys such as reduced nickel-cobalt hydrogenation catalyst. However, my experience indicates that very satisfactory results can be had with conventional nickel catalysts. The term nickel is used herein to encompass all forms of nickel catalyst.

The magnetic force necessary for removing nickel from the hydrogenated oil may be calculated in accordance with the following formula:

$$F = V_1 \times V_2 \times S \times 3\pi$$

wherein $F$ = the force that must be imparted to the individual nickel particles and is expressed in dynes.
$V_1$ = the viscosity of the hydrogenated oil passing through the filter in poises.
$V_2$ = the velocity of the oil flow expressed in centimeter per second.
$S$ = the particle size in centimeters.

In order to effectively remove nickel catalyst from the hydrogenated oil, the oil must be passed through a space containing a multiplicity of magnetic poles which will impose a magnetic force on the individual nickel particles in excess of that calculated in accordance with the foregoing formula.

The fats and oil that may be hydrogenated in accordance with the apparatus and method of this invention includes both edible and inedible triglycerides that are relatively free of catalytic poisons.

Obviously many modifications and variations of the invention as hereinbefore set forth may be made without departing from the spirit and scope thereof, and therefore only such limitations should be imposed as are indicated in the appended claims.

I claim:

1. A process of hydrogenating fat with a particulate nickel catalyst including the steps of introducing an amount of liquid fat and catalyst into a hydrogenation zone, hydrogenating said fat, removing the hydrogenated fat and catalyst from said zone and while at a temperature above about 200° F. passing them through a separation zone at a predetermined rate of flow in which zone are a plurality of closely spaced magnetic poles to remove at least the major portion of said catalyst from said fat, demagnetizing said poles after said hydrogenated fat has passed said separation zone, passing a second amount of unhydrogenated fat through said separation zone at a substantially greater rate of flow than said predetermined rate to pick up the catalyst therein, and introducing said second amount of fat and the picked up catalyst into a hydrogenation zone, all of said processing being carried on in the substantial absence of air.

2. A process of hydrogenating fat with a particulate nickel catalyst including the steps of introducing an amount of liquid fat and catalyst into a hydrogenation zone, heating said fat in said zone, hydrogenating said fat, removing the hydrogenated fat and catalyst from said zone and while at a temperature above about 200° F. passing them through a separation zone at a predetermined rate of flow in which zone are a plurality of closely spaced magnetic poles to remove at least the major portion of said catalyst from said fat, removing at least a portion of the heat from the hydrogenated fat, removing said separated catalyst from said separation zone by passing unhydrogenated fat through said separation zone at a substantially greater rate of flow and introducing said fat and the picked up catalyst into a hydrogenation zone, all of said processing being carried on in the substantial absence of air.

3. Apparatus for use in the hydrogenation of fat with a particulate catalyst having magnetic properties including a hydrogenation vessel having means to introduce and hydrogenate fat therein with said catalyst, conduit means connected to said vessel for removing the hydrogenated fat and catalyst from said vessel, and a magnetic separator in said conduit means, said separator comprising a vessel provided with an inlet and an outlet to permit the flow of the liquid through the interior of the vessel, a plurality of closely woven masses of magnetizable strands disposed within the interior in the path of flow of the liquid, several magnetizable grids separating said woven masses, and a source of magnetic flux disposed to place the plurality of the woven masses and the several magnetizable grids in the magnetic circuit of the source.

References Cited in the file of this patent

UNITED STATES PATENTS

| | | |
|---|---|---|
| 1,284,488 | Steward | Nov. 12, 1918 |
| 1,390,688 | Ellis | Sept. 13, 1921 |
| 2,786,047 | Jones et al. | Mar. 19, 1957 |